United States Patent Office 3,379,571
Patented Apr. 23, 1968

3,379,571
FUEL CELL WITH ELECTROLYTE OF
SOLID CRYSTALLINE SALT
Jean Piret, Watermael-Boitsfort, Belgium, assignor to
Societe d'Etudes, de Recherches et d'Applications pour
l'Industrie, S.E.R.A.I., Brussels, Belgium
No Drawing. Filed June 19, 1964, Ser. No. 376,566
Claims priority, application Great Britain, Mar. 13, 1964,
10,794/64
2 Claims. (Cl. 136—86)

ABSTRACT OF THE DISCLOSURE

A fuel cell comprising a pair of electrodes and a solid electrolyte in the form of a member comprising an inert carrier having admixed therewith crystalline grains of a salt selected from the class consisting of phosphates, vanadates, tungstates, phosphotungstates, molybdates and phosphomolybdates of titanium, zirconium, tin and niobium, the grains of salt having a particle size less than 50 microns. Preferably, the carrier is selected from the class consisting of asbestos, polyethylene, halogenated polyethylene, and silicones and the like.

---

This invention relates to improvements to fuel cells and more particularly to electrolytes for such cells.

It is known to use phosphates, vanadates, tungstates, arsenates and molybdates of metals of the 4th and 5th groups of the Periodic Arrangement of the Elements, such as titanium, zirconium, tin and niobium having ion exchanging properties, as electrolytes in fuel cells. It is also known to use said electrolytes under the form of a membrane formed by mixing the electrolyte to a carrier such as asbestos. The phosphates, vanadates, tungstates, arsenates and molybdates of the titanium, zirconium, tin, niobium, and the like used as electrolytes in fuel cells heretofore are generally amorphous.

It has now surprisingly been found that it is possible to obtain the above salts under the form of crystalline grains having ion-exchanging properties which are far better than those of the amorphous salts. The crystalline grains of the abovenamed salts are, in fact, a new allotropic form of said salts.

The invention relates therefore to an electrolyte for a fuel cell consisting in a membrane formed from a carrier mixed with crystalline grains of salts of the reaction of a polyacid with a cation of the 4th and 5th groups of Periodic Arrangement of the Elements.

The new compounds used according to the invention in an electrolytic membrane of a fuel cell include the crystalline grains of phosphates, vanadates, tungstates, phosphotungstates, molybdates and phosphomolybdates of titanium, zirconium, tin, niobium and metals of the same groups. The new electrolytes according to this invention include membranes containing an inert carrier or binder such as asbestos, polyethylene, halogenated polyethylenes, silicones and the like, as well as crystalline grains selected in the group consisting of crystalline phosphates, vanadates, tungstates and molybdates of titanium, zirconium, tin, niobium, and similar metals.

This invention also relates to fuel cells comprising a membrane of the above type interposed between two electrodes.

The crystalline grains used in a membrane of a fuel cell in accordance with the invention are obtained by a process in which a compound of a metal of the 4th and 5th groups of the Periodic Arrangement of the Elements is heated with sulphuric acid of a density of 1.84 g./cm.$^3$ (98%) at a temperature of more than 120° C. until a clear solution is obtained, an anhydrous polyacid selected in the class comprising phosphoric, vanadic, tungstic, phosphotungstic, molybdic and phosphomolybdic acids is then added to the solution and the mixture is heated at a temperature between 100 and 200° C. until crystalline grains are precipitated, said grains being finally recovered. The minimum particle size of the grains obtained by this process is of about 1.5 millimeters. For using the grains in a fuel cell, it is necessary to crush said grains to dimensions beneath 50 microns.

It is to be noted that the process is carried out in a substantially anhydrous medium, said medium containing sulphuric acid of a density of 1.84 g./cm.$^3$, an anhydrous polyacid and a compound of a metal of the 4th or 5th group of the Periodic Arrangement of the Elements. The use of such an anhydrous medium seems to be an important factor for obtaining crystalline grains.

The addition of a solubilizing agent, such as ammonium sulphate, to said medium is sometimes advantageous.

It is also possible to obtain crystalline grains of the above mentioned salts from the amorphous corresponding salts by a process in which an amorphous salt of a polyacid with a polyvalent cation of the 4th and 5th groups of the Periodic Arrangement of the Elements is mixed with an aqueous solution of sulphuric or nitric acid and of the polyacid from which said amorphous salt is derived and the mixture is heated at a temperature of 50 to 80° C. until crystalline grains are obtained.

The following examples are given for illustration purposes. Examples 1 to 6 describe the direct synthesis of crystalline grains to be used as ion-exchangers in an electrolytic membrane of a fuel cell according to the invention. Examples 7 to 10 describe the preparation of crystalline grains of ion-exchange salts from the corresponding amorphous salts by the above described process.

Example 1

80 g. of zirconium oxide are mixed with 250 g. of ammonium sulphate [(NH$_4$)$_2$SO$_4$] and 1000 ml. of sulphuric acid having a density of 1.84 g./cm.$^3$ (98%). The substantially water free mixture is gradually heated to 250° C., while being stirred. A clear solution of zirconium sulphate in highly concentrated sulphuric acid is obtained. In view of the low solubility of zirconium oxide in sulphuric acid, ammonium sulphate is used, so as to form a more soluble complex with zirconium in sulphuric medium. The obtained clear solution is cooled and 250 ml. of phosphoric acid of a density of 1.70 g./cm.$^3$ (85%) is then added. The mixture is stirred and gradually heated to 170° C. within 2 hours. The obtained gel is cooled, filtered on a Büchner filter and washed with deionized water until the filtrate is no more acid, that is to say that the product is free from sulphate and ammonium ions and excess acid. Then the product is air dried. The product has the form of crystalline grains, having an average particle size of 1.5 millimeters.

Example 2

40 g. of titanium oxide are mixed with 150 g. of ammonium sulphate and 1000 ml. of sulphuric acid having a density of 1.84 g./cm.$^3$ (98%). The substantially water free mixture is gradually heated to 180° C., while being stirred. A clear solution of titanium sulphate in highly concentrated sulphuric acid is obtained.

Ammonium sulphate has been added to said medium in order to form a complex salt of titanium and ammonium, said complex salt being soluble in concentrated sulphuric acid.

The obtained clear solution is cooled and 250 ml. of phosphoric acid of a density of 1.70 g./cm.$^3$ (85%) are then added. The mixture is stirred and gradually heated to 170° C. within 2 hours. The obtained gel is then filtered on a Büchner filter and washed with deionized water until the filtrate is no more acid. Finally, the product is air dried. The product has the form of crystalline grains. Average particle size: 3–4 millimeters.

Example 3

500 ml. of a solution of titanium tetrachloride (15%) of a density of 1.14 g./cm.$^3$ are mixed to 500 ml. of sulphuric acid of a density of 1.84 g./cm.$^3$ (98%). The mixture is heated gradually to 150° C. The heating is stopped when a clear solution is obtained. The volume is then of about 65 to 70% of the initial volume. The clear solution is cooled and 200 ml. of phosphoric acid ($d=1.70$ g./cm.$^3$; 85%) are added thereto. The mixture is made homogeneous by stirring and then gradually heated at 170° C. during about 2 hours. The obtained gel is treated as in Example 1 or Example 2 to give a product similar to that of Example 2.

Example 4

380 g. of hydrated tin chloride $SnCl_2.2H_2O$ are mixed to 1000 ml. of sulphuric acid of a density of 1.84 g./cm.$^3$ (98%). The mixture is heated gradually to 180° C. The heating is stopped when a clear solution is obtained. The volume is then about 75% to 80% of the initial volume. In order to oxidate $Sn^{2+}$ to $Sn^{4+}$, $Br_2$ is used and the excess of $Br_2$ is driven off by heating. The clear solution of stannic sulphate is cooled and 250 ml. of phosphoric acid ($d=1.70$ g./cm.$^3$; 85%) are added thereto. The mixture is made homogeneous by stirring and then gradually heated at 120° C. during about 10 minutes.

The obtained gel is treated as in Example 1 to give a product having the form of crystalline grains. Average particle size: 2 millimeters.

Example 5

10 g. of Nb metal are mixed with 30 g. of ammonium sulphate $[(NH_4)_2SO_4]$ and 160 ml. of sulphuric acid having a density of 1.84 g./cm.$^3$ (98%). The substantially water free mixture is gradually heated to 200° C., while being stirred. A clear solution of niobium sulphate in highly concentrated sulphuric acid is obtained. In order to accelerate the dissolution of niobium metal, ammonium sulphate is used.

The obtained clear solution is cooled and 52 ml. of phosphoric acid of a density of 1.70 g./cm.$^3$ (85%) are then added. The mixture is stirred and gradually heated to 150° C. within 1 hour. The obtained gel is then filtered on a Büchner filter and treated as in Example 1 or Example 2. The product has the form of crystalline grains having an average particle size of 1.5 millimeter.

Example 6

85 ml. of a solution of stannic sulphate in sulphuric acid as in Example 4 are mixed with 50 ml. of a solution of 16% of ammonium molybdate in sulphuric acid (98%) and 150 ml. of orthophosphoric acid (1.7 g./cm.$^3$). The mixture is made homogeneous by stirring and then gradually heated at 160° C. within 1 hour. The obtained gel is treated as in Example 1 to give a product having the form of crystalline grains of stannic phosphomolybdate, having an average particle size of 4–5 millimeters.

Example 7

100 g. of grains of amorphous titanium phosphate are mixed with 1500 ml. of orthophosphoric acid (15 N), 750 ml. of sulphuric acid (98%) and 2500 ml. of deionized water. The mixture is heated during 16 hours at a temperature of 55° C. The resulting compound is washed with deionized water on a column until the filtrate is no more acid. The obtained product is then air dried. Crystalline grains are obtained. The crystalline grains have an average particle size of 3 millimeters.

Example 8

Crystalline grains of niobium phosphate are obtained from amorphous niobium phosphate grains as described in Example 7.

Example 9

100 g. of grains of amorphous titanium phosphate are mixed with 1500 ml. of orthophosphoric acid (15 N), 1800 ml. of nitric acid (15 N) and 2500 ml. of deionized water. The mixture is heated during 12 hours at a temperature of 60° C. The resulting compound is washed with deionized water on a column until the filtrate is no more acid. The obtained product is then air dried.

Example 10

100 g. of grains of amorphous stannic phosphomolybdate are mixed with 1500 ml. of sulphuric acid (98%), 100 ml. of orthophosphoric acid (85%) and 500 ml. of deionized water. The mixture is heated during 65 hours at a temperature of 65° C. The resulting compound is treated as in Example 7. Crystalline grains are obtained of an average particle size of 4 millimeters.

The procedures described in Examples 1 to 10 may be used for obtaining crystalline grains of other phosphates as well as vanadates, tungstates, molybdates, phosphotungstates and phosphomolybdates of titanium, zirconium, tin, niobium and metals of the same groups.

The ion exchange capacity of various ion-exchange crystalline salts in grain form of a particle size range between 0.540 and 0.250 mm. has been tested by static and dynamic methods (F. Helfferich—Ion Exchange, McGraw-Hill, New York, 1962, pp. 91 and 493).

In the static method, 5 g. of the compound to be tested are stirred during 6 hours in presence of copper or cobalt acetate at pH 5.6.

In the dynamic method, the testing liquid passes at constant speed through a fixed bed or column (6 x 100 mm.) containing the ion exchanging material. In this case a pH of 4.00 and a flow of 0.068 l./hour were chosen.

The following table shows the results for some static and dynamic tests.

TABLE

| Ion exchange crystalline salts in grain form | Exchange capacity | | |
|---|---|---|---|
| | Static test | | Dynamic test |
| | Co$^{2+}$ | Cu$^{2+}$ | |
| Zirconium phosphate (a) | 0.24 | | |
| Zirconium phosphate (b) | 2.7 | | |
| Titanium phosphate (a) | | 0.57 | 2.07 |
| Titanium phosphate (b) | | 1.97 | 7.6 |
| Titanium phosphate (c) | | | 9.3 |
| Niobium phosphate (a) | | 1.00 | |
| Niobium phosphate (b) | | 1.50 | |
| Tin phosphomolybdate (a) | | | 2.25 |
| Tin phosphomolybdate (b) | | | 4.18 |
| Titanium phosphotungstate (a) | | | 3.00 |
| Titanium phosphotungstate (b) | | | 3.50 |

In this table, (a) means that the salt is amorphous, (b) means that the salt is a crystalline and granular salt which has been prepared from an amorphous salt by the process described in Eaxmples 7, 8, 9 and 10, and (c) means that the salt is under the form of crystalline grains which have been prepared by direct or one step synthesis as described in Examples 1 to 6.

This table shows clearly that the ion exchange characteristics of the crystalline grains according to this invention are very much improved with respect to amorphous samples.

The fact that the salts obtained by the process according to this invention are crystalline has been confirmed by many tests as briefly indicated hereafter:

chemical analysis (X-ray fluorescence) shows that the phosphorus to titanium atom ratio (for titanium phosphate) is the same for improved (crystalline grains) and usual (amorphous) compounds;

X-ray diagrams (diffraction) show that the usual substance (Zr, Sn and Ti phosphates, phosphomolybdate, phosphotungstate) is almost completely amorphous, whereas the improved materials (crystalline grains) do show a definite degree of crystallization (presence of very strong lines in the diagrams);

for titanium phosphate thermo-differential analysis curves show a peak of about 120° C. This peak corresponds most probably to the presence of water of crystallization. The peak of the usual amorphous substance is very diffuse while the peak of the diagram of the improved substances (crystalline grains) is very sharp. These peaks again imply a high degree of crystallization for the improved substance.

I claim:

1. In a fuel cell comprising a pair of electrodes and a solid electrolyte, the improvement in which said solid electrolyte is a membrane formed from an inert carrier mixed with crystalline grains of a salt selected from the class consisting of the phosphates, vanadates, tungstates, phosphotungstates, molybdates and phosphomolybdates of titanium, zirconium, tin and niobium, said grains having a particle size less than 50 microns.

2. A fuel cell as claimed in claim 1, in which the inert carrier is selected from the class consisting of asbestos, polyethylene, halogenated polyethylene, and silicones.

References Cited

UNITED STATES PATENTS 3,056,647   10/1962   Amphett.
3,276,910   10/1966   Grasselli et al. _____ 136—86

FOREIGN PATENTS 1,334,263   6/1963   France.

ALLEN B. CURTIS, *Primary Examiner.*